(12) United States Patent
Deprun

(10) Patent No.: US 9,807,158 B2
(45) Date of Patent: Oct. 31, 2017

(54) METHOD AND SYSTEM FOR OPTIMIZING CPNS ENABLER

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 1200 days.

(21) Appl. No.: 13/319,920

(22) PCT Filed: May 3, 2010

(86) PCT No.: PCT/KR2010/002807
§ 371 (c)(1),
(2), (4) Date: Nov. 10, 2011

(87) PCT Pub. No.: WO2010/131860
PCT Pub. Date: Nov. 18, 2010

(65) Prior Publication Data
US 2012/0066332 A1    Mar. 15, 2012

Related U.S. Application Data

(60) Provisional application No. 61/178,059, filed on May 14, 2009.

(51) Int. Cl.
| | | |
|---|---|---|
| G06F 15/16 | (2006.01) | |
| H04L 29/08 | (2006.01) | |
| H04W 4/02 | (2009.01) | |
| H04L 29/14 | (2006.01) | |
| H04W 64/00 | (2009.01) | |

(52) U.S. Cl.
CPC ...... *H04L 67/1008* (2013.01); *H04L 67/1002* (2013.01); *H04L 67/1029* (2013.01); *H04L 67/1034* (2013.01); *H04L 67/125* (2013.01); *H04L 69/40* (2013.01); *H04W 4/02* (2013.01); *H04W 64/00* (2013.01)

(58) Field of Classification Search
CPC ............. H04L 67/1002; H04L 67/1008; H04L 67/125; H04W 64/00; H04W 4/02
USPC ........................................................ 709/206
See application file for complete search history.

(56) References Cited

U.S. PATENT DOCUMENTS 8,165,051 B2 *   4/2012   Aad et al. ...................... 370/311
2003/0124979 A1 *   7/2003   Tanada et al. ................... 455/41

(Continued)

FOREIGN PATENT DOCUMENTS

| EP | 1 874 005 A1 | 1/2008 |
| EP | 1 968 273 A1 | 9/2008 |

*Primary Examiner* — Tonia L Dollinger
*Assistant Examiner* — Adam Cooney
(74) *Attorney, Agent, or Firm* — Birch, Stewart, Kolasch & Birch, LLP

(57) ABSTRACT

A method and apparatus for optimizing the use of CPNS entities are discussed. According to an embodiment, a method includes receiving, by a CPNS server, a low battery level indication for an operation from a certain one of CPNS entities; requesting, by the CPNS server, battery level information from at least some of the CPNS entities in response to the low battery level indication; determining, by the CPNS server, life expectancy information for each of the at least some of the CPNS entities based on the battery level information; and transmitting, by the CPNS server, a message to at least one CPNS gateway to use one of the at least some of the CPNS entities instead of the certain one of the CPNS entities to perform the operation, based on the life expectancy information.

10 Claims, 11 Drawing Sheets

(56) References Cited

U.S. PATENT DOCUMENTS

| | | |
|---|---|---|
| 2006/0025169 A1 | 2/2006 | Maciocco et al. |
| 2008/0049653 A1 | 2/2008 | Demirhan et al. |
| 2009/0210536 A1* | 8/2009 | Allen .................. H04M 3/58 709/227 |
| 2010/0293183 A1* | 11/2010 | Yaqub ........................ 707/769 |

* cited by examiner

[Fig. 1]
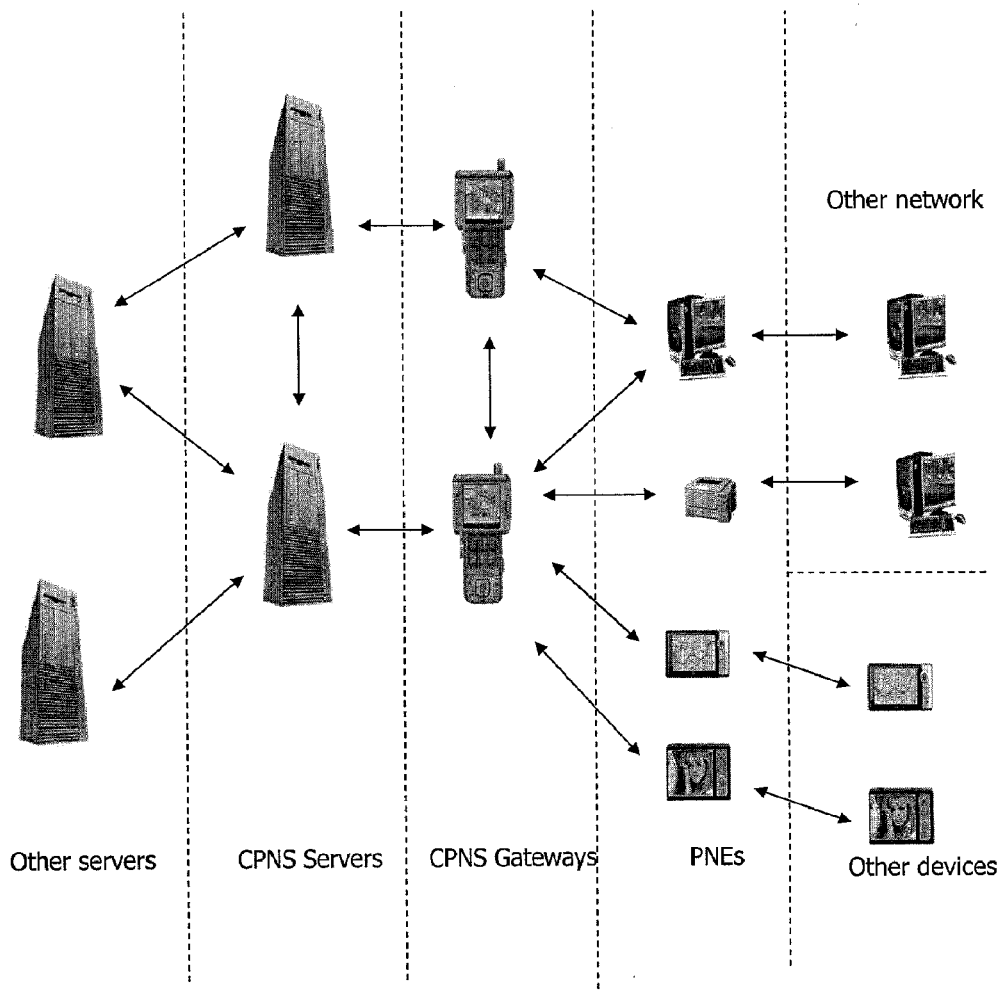

[Fig. 2]
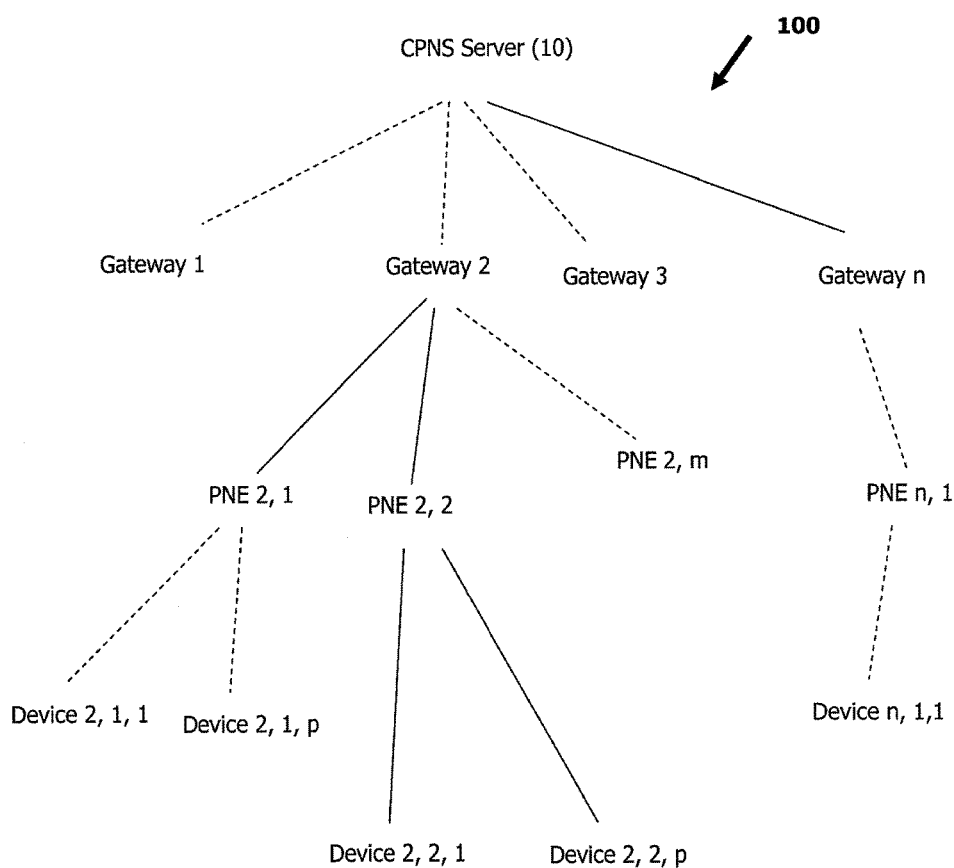

[Fig. 3]
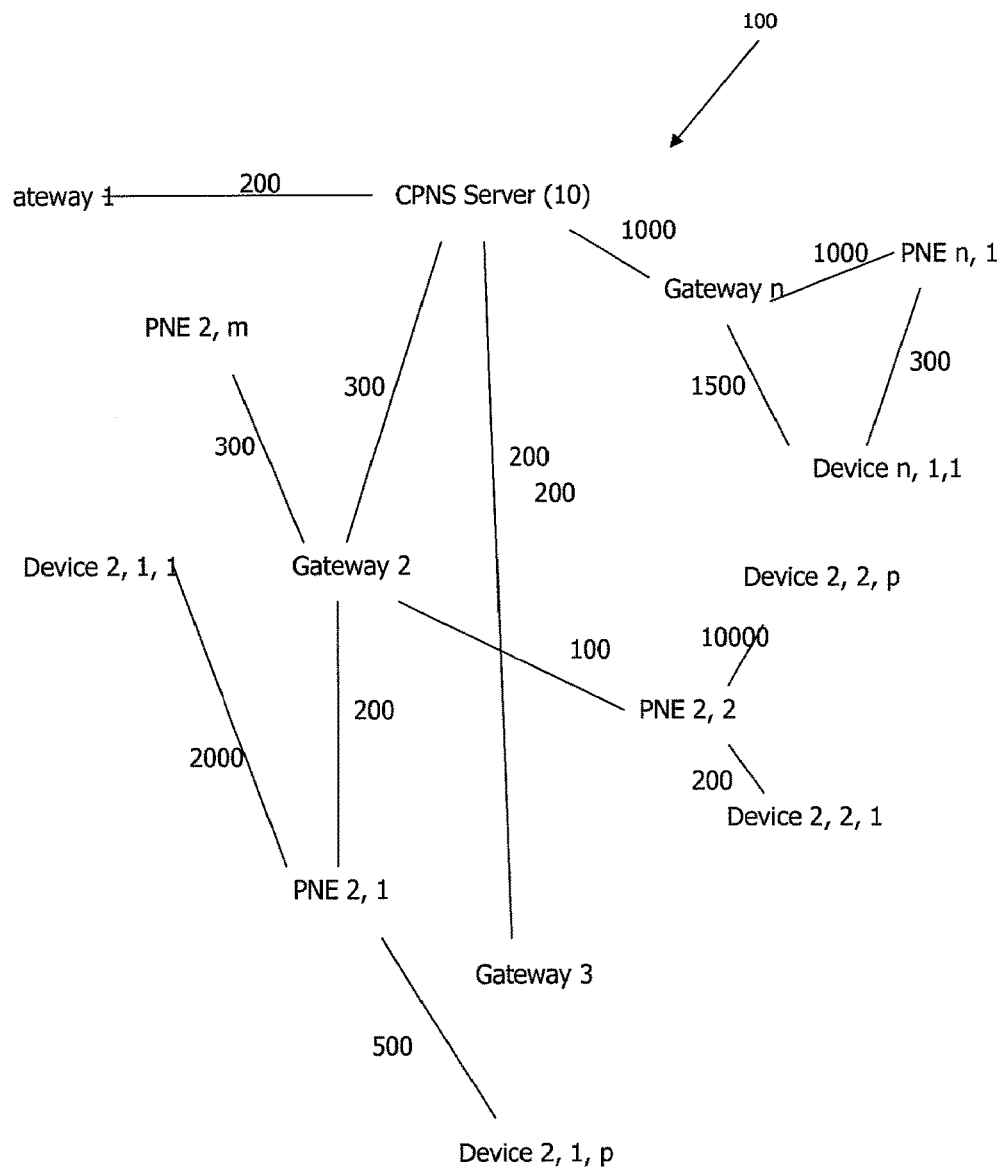

[Fig. 4]
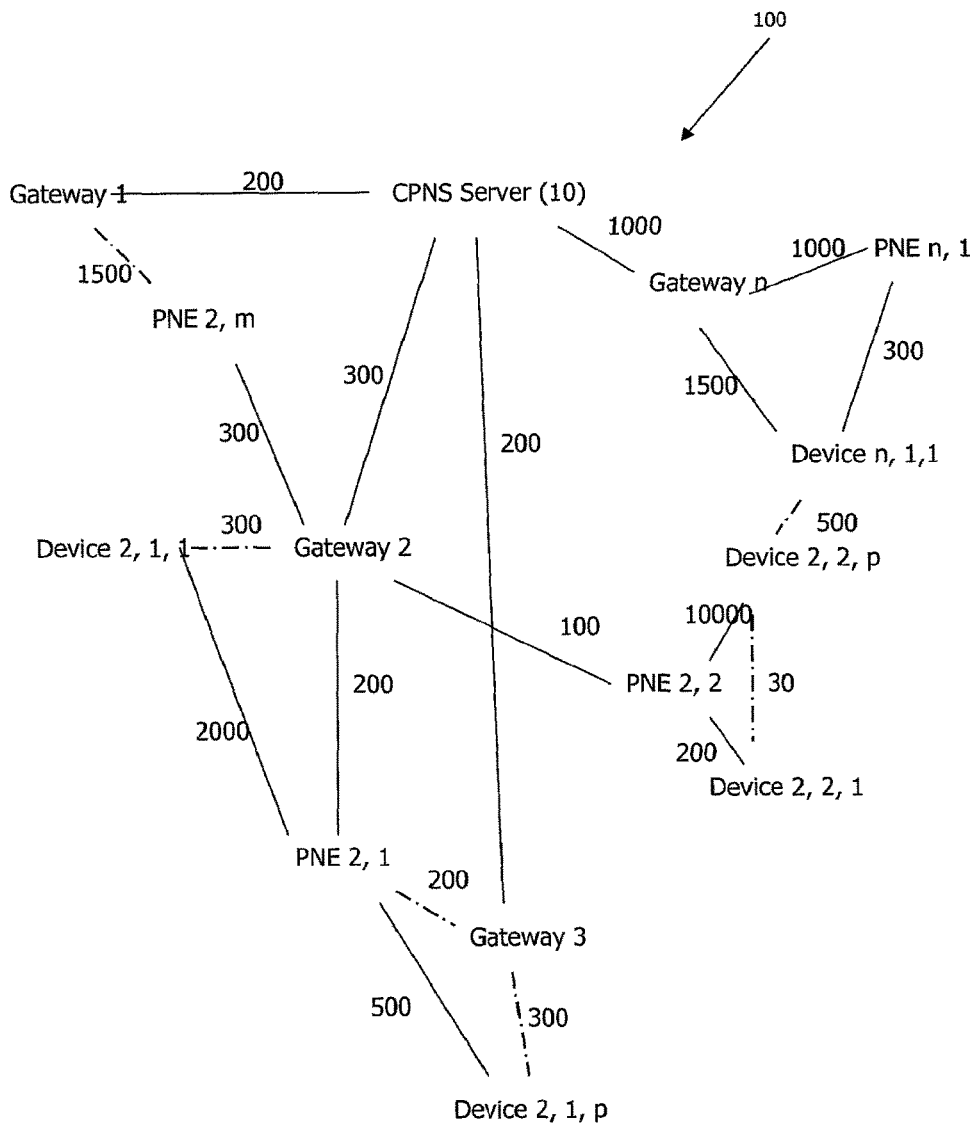

[Fig. 5]
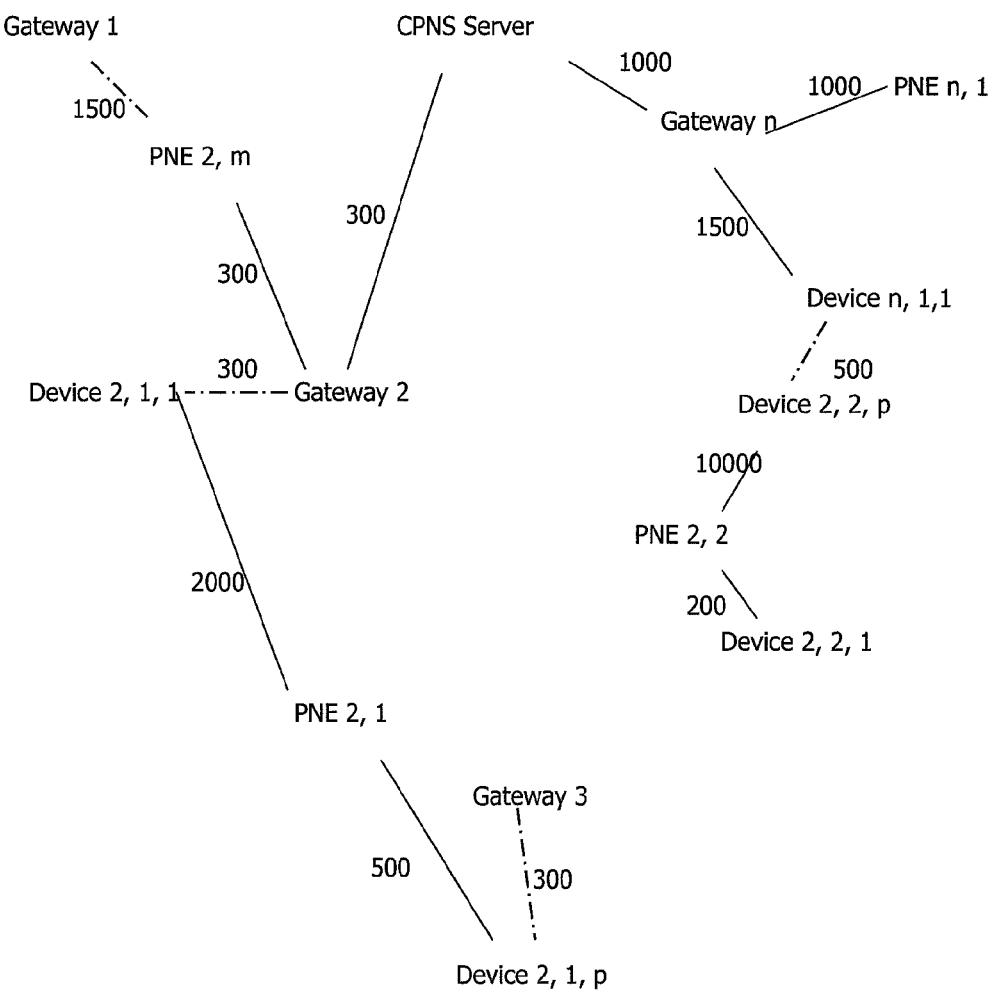

[Fig. 6]
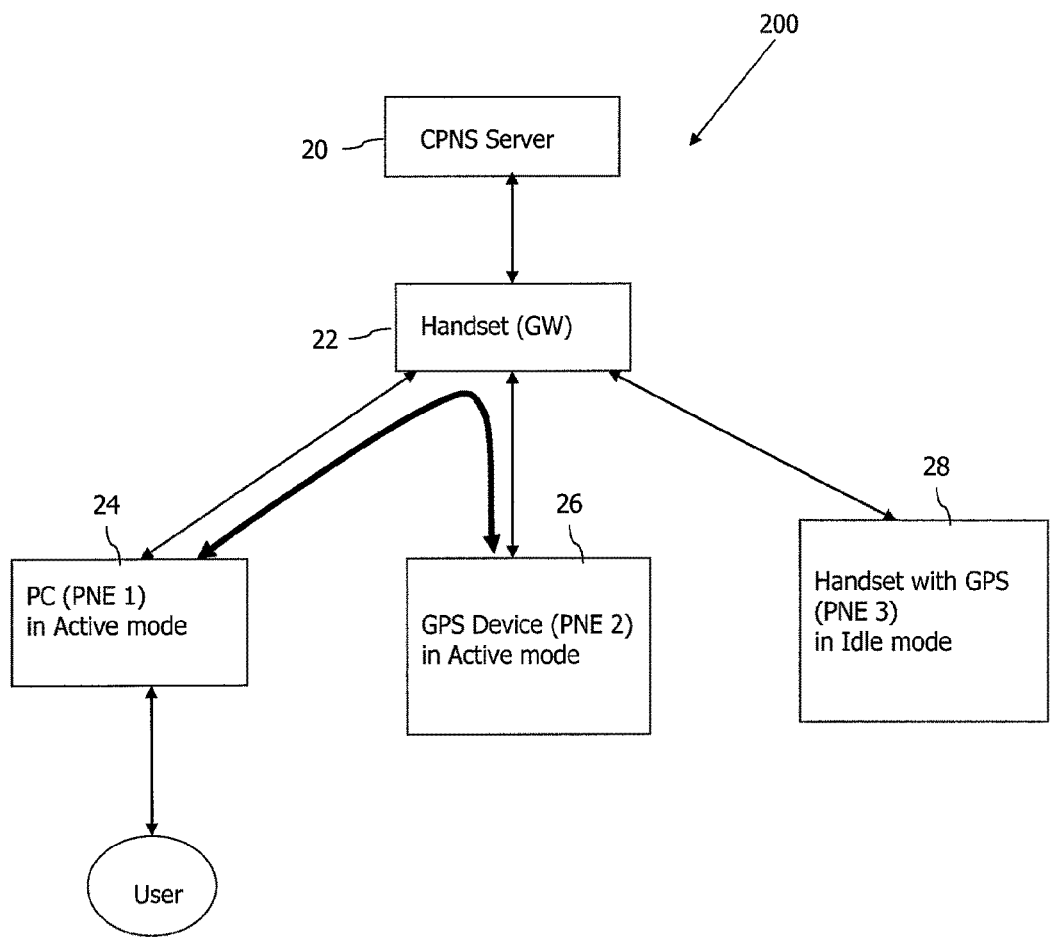

[Fig. 7]
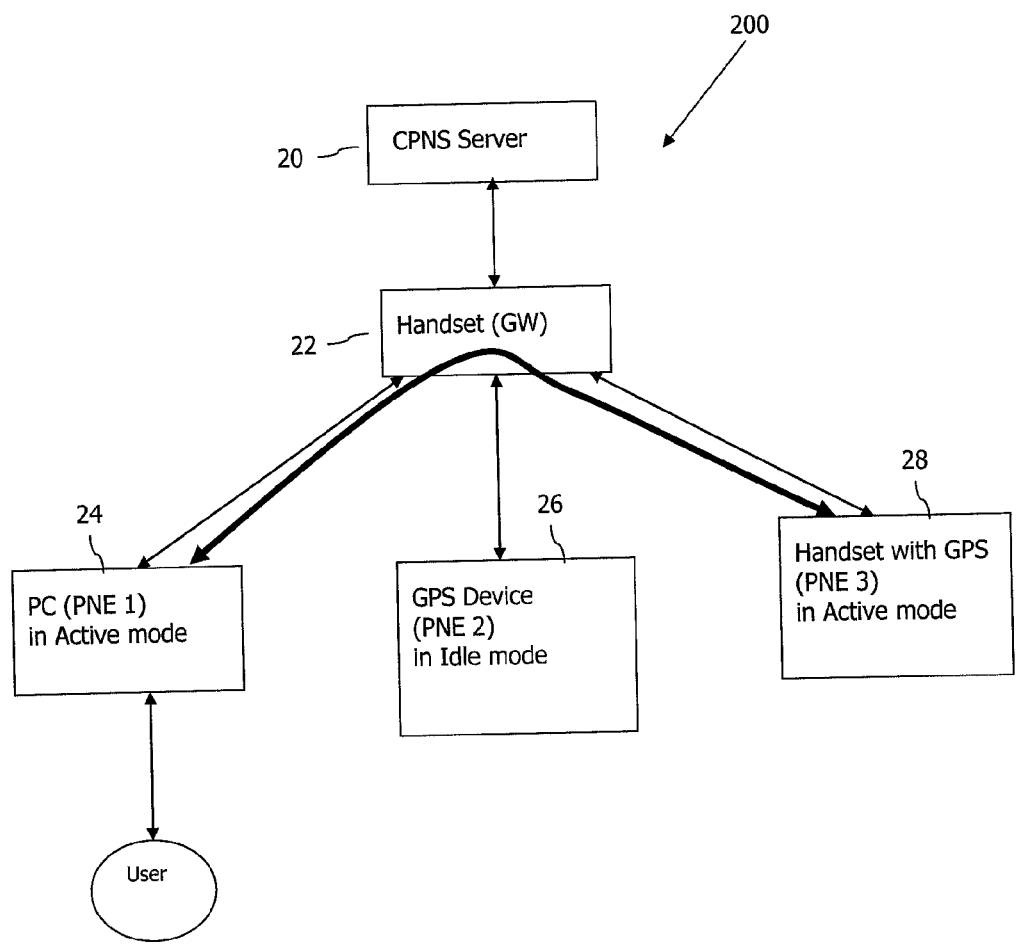

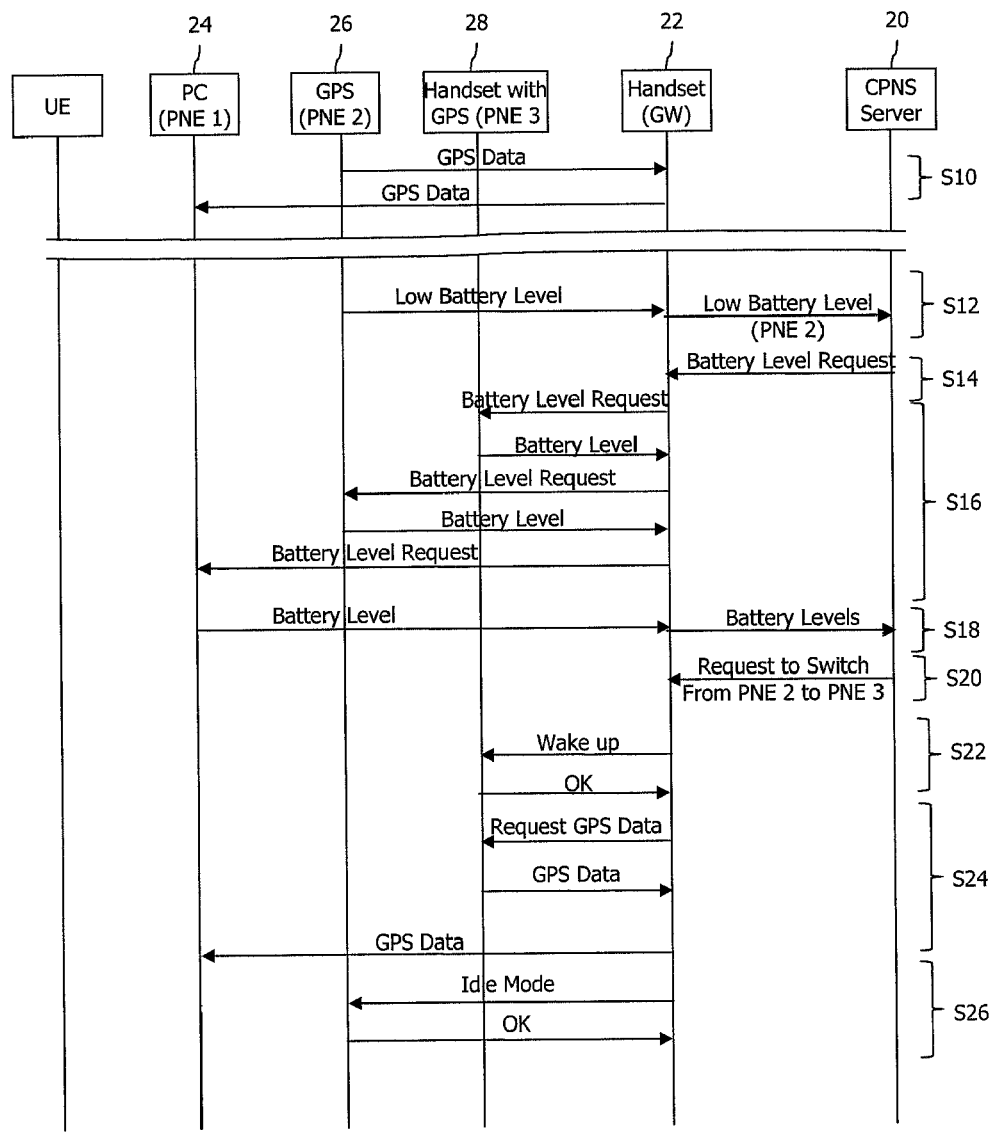
[Fig. 8]

[Fig. 9]
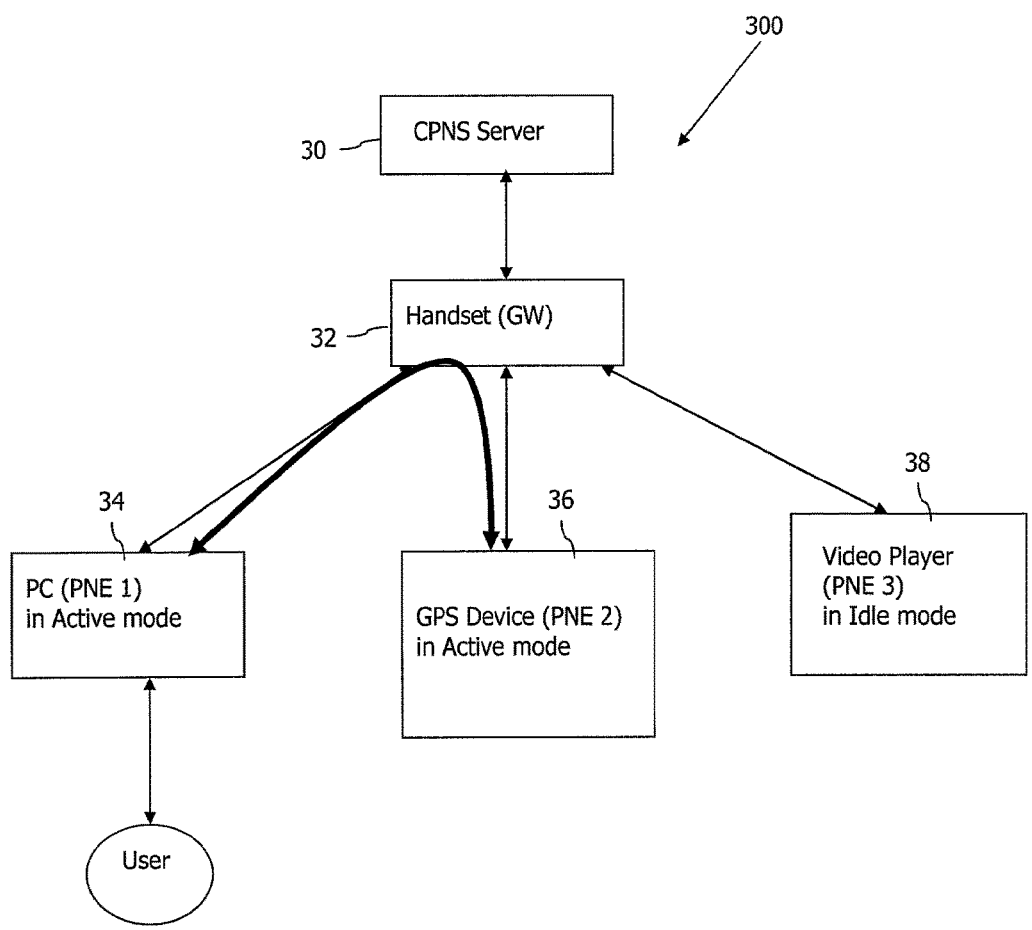

[Fig. 10]
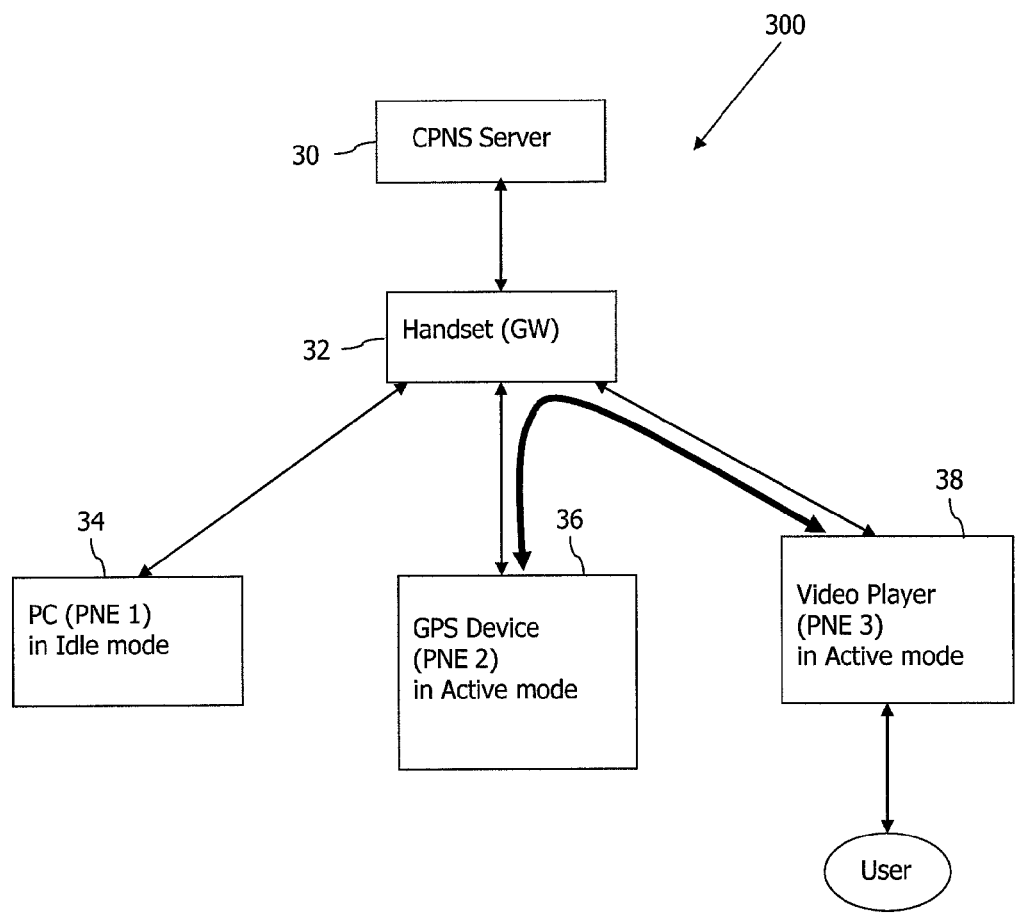

[Fig. 11]
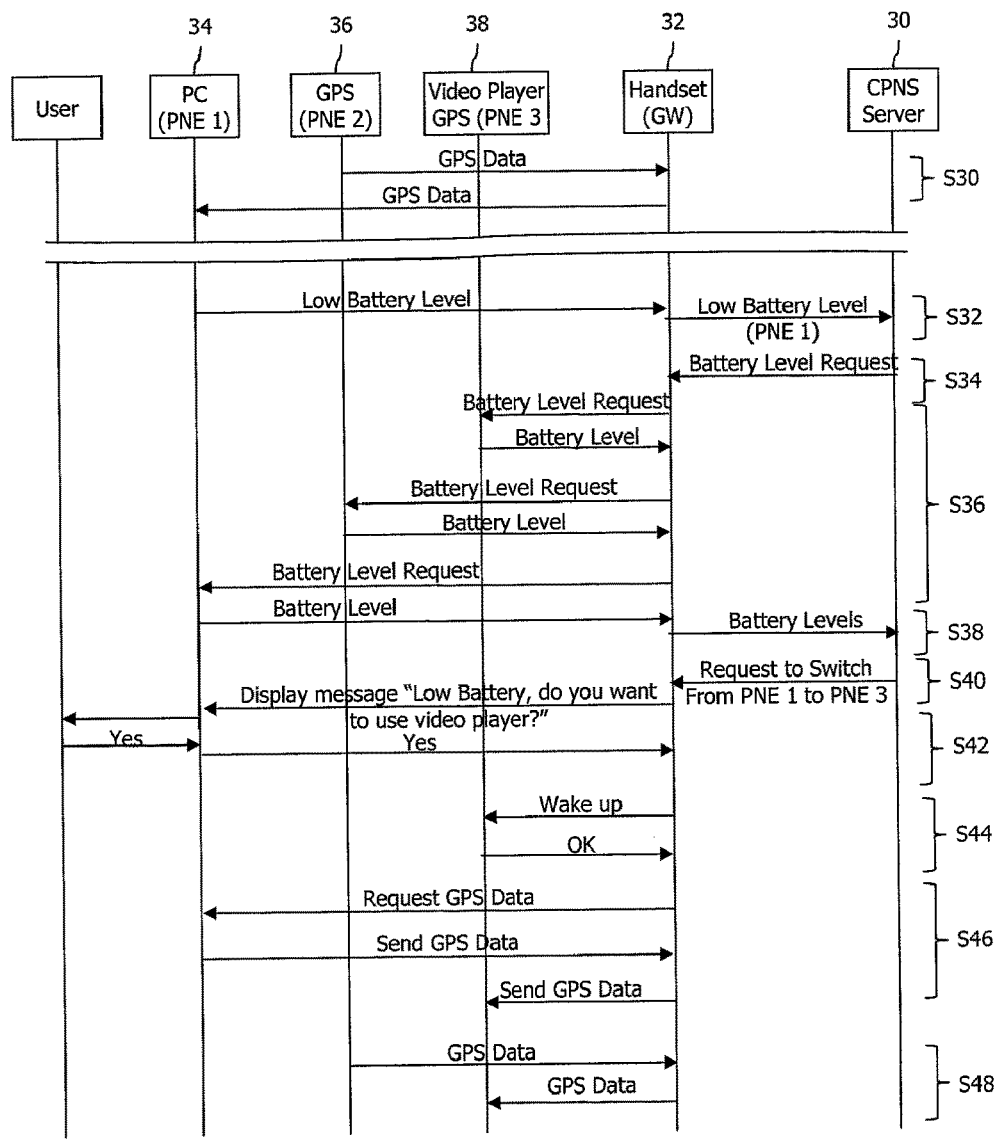

METHOD AND SYSTEM FOR OPTIMIZING CPNS ENABLER

This application is the National Phase of PCT/KR2010/002807 filed on May 3, 2010, which claims priority under 35 U.S.C. 119(e) to U.S. Provisional Application No. 61/178,059 filed on May 14, 2009, all of which are hereby expressly incorporated by reference into the present application.

TECHNICAL FIELD

The present invention relates to optimizing the resources of a CPNS (Converged Personal Network Service) enabler.

BACKGROUND ART

Among various technologies being developed, Converged Personal Network Service (CPNS) is a service that allows devices in one Personal Network (PN) to access services outside that PN, e.g., another PN or other network. Generally the CPNS is implemented by a CPNS enabler which can include a CPNS server, one or more Gateways (GWs), and one or more PNEs (Personal Network Elements). A PN GW connects one PNE to server e.g., using a mobile communication network. Furthermore a PN GW generally connects one PN to another PN, e.g., using a mobile communication network. A PNE is basic component that makes up a PN, and can be a single device or a group of devices. These components and general operations of the CPNS are also discussed in Open Mobile Alliance (OMA) telecommunications standards documents.

FIG. 1 illustrates an example of a CPNS enabler according to a related art. As shown in FIG. 1, a CPNS server can communicate and exchange data with one or more PN gateways, each of which in turn can communicate and exchange data with one or more PNEs in a PAN (Personal Area Network).

Each of the PNEs can communicate and exchange data with the PN gateways, other devices or PNEs in other networks, etc. Each of the PN gateways can communicate and exchange data with the CPNS servers, other PN gateways, PNEs, etc. Each CPNS server can also communicate with other servers, gateways, etc. For instance, the CPNS server and the PN gateway (e.g., mobile phone) can communicate with each other through a cellular network, while the PN gateway can communicate with the PNEs through the WPAN such as Bluetooth, NFC, WiBree, Wi-Fi, etc. Generally communications between the CPNS servers, gateways, and PNEs are carried out using known networks and techniques, e.g., Bluetooth, 802.11, Wi-Fi, WPAN (Wireless Personal Area Network), cellular networks such as 3GPP, etc.

The CPNS server generally manages and controls communications among the PN gateways and PNEs so that applications and information among these units of the CPNS enabler can be shared with each other to enhance the user experience. For instance, in FIG. 1, according to the CPNS service of the CPNS enabler, a user at one PNE (e.g., Portable Multimedia Player—PMP) can view GPS (Global Positioning System) information which is received from another PNE (e.g., GPS device) through a PN gateway (e.g., cellular phone). As a result, the user can have access to a more variety of services that are offered within the user's current PAN as well as outside the PAN.

There is, however, a limitation associated with the CPNS enabler. In the above example, if the PMP runs out of battery and does not have access to other backup power, then the user can no longer view the GPS information at the PMP. Similarly, if the GPS device runs out of battery and does not have access to other backup power, then the GPS information can no longer be sent from the GPS device to the PMP and thus the user at the PMP can no longer view the GPS information.

DISCLOSURE OF INVENTION

Solution to Problem

The present invention provides an enhanced CPNS service by optimizing the resources of a CPNS enabler.

The present invention allows a method and system for optimizing the life expectancy of the units of a CPNS enabler, which address the limitations and disadvantages associated with the related art.

According to one aspect, the present invention provides a method for optimizing resources of a CPNS (Converged Personal Network Service) enabler, the CPNS enabler including a CPNS server and a plurality of CPNS entities, the plurality of CPNS entities including at least one CPNS gateway and at least one PNE (Personal Network Element), the method comprising: receiving, by the CPNS server, a low battery level indication for an operation from a certain one of the CPNS entities; requesting, by the CPNS server, battery level information from at least some of the CPNS entities in response to the low battery level indication; determining, by the CPNS server, life expectancy information for each of the at least some of the CPNS entities based on the battery level information; and transmitting, by the CPNS server, a message to the at least one CPNS gateway to use one of the at least some of the CPNS entities instead of the certain one of the CPNS entities to perform the operation, based on the life expectancy information.

According to another aspect, the present invention provides a method for optimizing resources of a CPNS (Converged Personal Network Service) enabler, the CPNS enabler including a CPNS server and a plurality of CPNS entities, the plurality of CPNS entities including a CPNS gateway and a plurality of PNEs (Personal Network Elements) including first, second and third PNEs, the method comprising: transmitting, by the CPNS gateway to the CPNS server, battery level information from the plurality of PNEs when the first PNE is currently performing a specific operation in an active mode with the third PNE; receiving, by the CPNS gateway from the CPNS server, an instruction message to switch from the first PNE to the second PNE, the instruction message being based on life expectancy information of the plurality of PNEs associated with the battery level information; transmitting, by the CPNS gateway, a message to wake up to the second PNE from an idle mode to an active mode; receiving, by the CPNS gateway, a response message in response to the message to wake up from the second PNE; and configuring, by the CPNS gateway, the second PNE to perform the specific operation with the third PNE while switching the first PNE from the active mode to an idle mode.

According to another aspect, the present invention provides a CPNS (Converged Personal Network Service) server for optimizing resources of a CPNS enabler including the CPNS server and a plurality of CPNS entities, the plurality of CPNS entities including at least one CPNS gateway and at least one PNE (Personal Network Element), the CPNS server comprising: a processor configured to: receive a low battery level indication for an operation from a certain one of the CPNS entities; request battery level information from at least some of the CPNS entities in response to the low battery level indication; determine life expectancy information for each of the at least some of the CPNS entities based on the battery level information; and transmit a message to the at least one CPNS gateway to use one of the at least some of the CPNS entities instead of the certain one of the CPNS entities to perform the operation, based on the life expectancy information.

According to another aspect, the present invention provides a CPNS (Converged Personal Network Service) gateway for optimizing resources of a CPNS enabler including a CPNS server and a plurality of CPNS entities, the plurality of CPNS entities including the CPNS gateway and a plurality of PNEs (Personal Network Elements) including first, second and third PNEs, the CPNS gateway comprising: a transceiver; and a processor, cooperating with the transceiver and configured to: transmit, to the CPNS server, battery level information from the plurality of PNEs when the first PNE is currently performing a specific operation in an active mode with the third PNE; receive, from the CPNS server, an instruction message to switch from the first PNE to the second PNE, the instruction message being based on life expectancy information of the plurality of PNEs associated with the battery level information; transmit a message to wake up to the second PNE from an idle mode to an active mode; receive a response message in response to the message to wake up from the second PNE; and configure the second PNE to perform the specific operation with the third PNE while switching the first PNE from the active mode to an idle mode.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein:

FIG. 1 is a diagram of a CPNS enabler according to a related art;

FIG. 2 is a graph illustrating the configurations of a CPNS enabler according to an embodiment of the invention;

FIG. 3 is a graph illustrating the configurations of a CPNS enabler, including life expectancy information before optimization, according to an embodiment of the invention;

FIG. 4 is a graph illustrating the configurations of a CPNS enabler, including new connections that are possible based on life expectancy information, according to an embodiment of the invention;

FIG. 5 is a graph illustrating the configurations of a CPNS enabler, including life expectancy information after optimization, according to an embodiment of the invention;

FIGS. 6 and 7 are diagrams illustrating a first example of a CPNS enabler and its optimization operation according to an embodiment of the invention;

FIG. 8 is a flowchart illustrating a method of optimizing the life expectancy of the CPNS enabler of FIGS. 6 and 7 according to an embodiment of the invention;

FIGS. 9 and 10 are diagrams illustrating a second example of a CPNS enabler and its optimization operation according to an embodiment of the invention; and FIG. 11 is a flowchart illustrating a method of optimizing the life expectancy of the CPNS enabler of FIGS. 9 and 10 according to an embodiment of the invention.

MODE FOR THE INVENTION

Hereinafter, exemplary embodiments of the invention will be described in detail with reference to the attached drawings. The embodiments described below are intended to exemplify the technical spirit of the invention, but are not intended to limit the scope of the invention.

The embodiments of the present invention provide an enhanced CPNS enabler in which a CPNS server can obtain and store configuration/connection information about the various units of the CPNS enabler as well store and update battery life information about each connection/link among the units of the CPNS enabler. The CPNS server may also store user preference information and/or operator policy information. This can occur preferably in an idle mode, but may occur in an active mode. The CPNS server then can use one or more of the stored information to change the connections among the entities of the CPNS enabler to optimize the use of the resources of the CPNS server, e.g., to optimize the life expectancy of each component of the CPNS server. This can occur in an idle mode, but may occur in an active mode. As a result, a user can continue to receive a desired service/operation through at least one of the units of the CPNS server.

According to an embodiment, a CPNS enabler preferably includes at least one CPNS server and a plurality of CPNS entities. The CPNS server and CPNS entities are also referred to herein as the units of the CPNS enabler or CPNS units. The CPNS entity is referred to herein as merely an entity and can be a CPNS gateway (or PN gateway) or PNE (or Device coupled to the PNE). Some examples of the PNEs can be a handset or mobile terminal, GPS, navigation device, MP3 player, audio/video player, PMP (Portable Multimedia Player), handset with GPS, PC (Personal Computer), desktop, computer notebook, printer, computer tablet, scanner, etc. Some examples of the PN gateways can be a mobile terminal or handset, home gateway, smart phone, set top box, computer notebook, etc.

According to an embodiment, the invention provides a method of optimizing the CPNS enabler. In this method, the CPNS server obtains and stores configuration information of the CPNS enabler in an idle mode (e.g., non-active mode). The CPNS server can also update the configuration information at certain time intervals or as needed, and stores the updated information. The configuration information can be represented and continuously stored in the CPNS server in a graphical form, but can be stored in other forms. The configuration information can provide information about the architecture of the units of the CPNS enabler as well as their connections. The CPNS server also can store policy information and/or user preference information associated with each or some of the units of the CPNS enabler. Then the CPNS server utilizes the stored information to optimize the connections and use of the entities of the CPNS enabler. This optimization can occur in the idle mode or in an active/user mode, e.g., in real time, e.g., while an application or program is running and active in those units. The details of the method will now be discussed by referring to specific examples.

FIG. 2 is a graph illustrating the configurations of a CPNS enabler 100 according to an embodiment of the invention. As shown in FIG. 2, the CPNS enabler 100 can include a CPNS server 10, a plurality of gateways (Gateway 1 through Gateway n), a plurality of PNEs (PNE 2,1 through PNE n,1), and a plurality of devices (Devices 2,1,1 through Device n,1,1). All the units of the CPNS enabler 100 are operatively coupled and configured, and communicate amongst each other as configured using known networks and techniques, e.g., Bluetooth, 802.11, Wi-Fi, WPAN (Wireless Personal Area Network), cellular networks such as 3GPP, etc. Further, a gateway can become and function as a PNE and vice versa. The Devices of the CPN enabler 100 can also be PNEs or devices coupled to the PNEs.

In an idle mode, the CPNS server 10 obtains information about the configuration, connections, architecture, etc. of the CPNS enabler 100, and store such information in a storage unit (or database). The storage unit can reside at the CPNS server 10 or can be at another location. Although specific names may be given, each unit of the CPNS enabler 100 can be identified by a specific number in bracket, such as:

Gateway [1] to Gateway [n], where n is a positive integer;
PNE [x,1] to PNE [x,m], where $1=<x<=n$ and m is a positive integer; and
Device [x,y,1] to Device [x,y,p], where $1=<x<=n$, $1=<y<=m$ and p is a positive integer.

For each entity (e.g., gateway, PNE, or Device) of the CPNS enabler 100, the CPNS server 10 preferably stores static information and/or dynamic information as applicable. The CPNS server 10 can also store static and/or dynamic information about itself. Static information is information that is fixed or changes rarely, whereas the dynamic information is information that changes regularly, in real time, or as needed. For instance, the static information can be information on the size of the screen (e.g., size of the laptop if the PNE is the laptop), wireless features (e.g., use of Bluetooth, Wi-Fi, etc.), codec information (e.g., use of MP4, DivX, H624 for video coding, etc.), size of the battery the CPNS unit has, capabilities and functions of the CPNS unit, etc. The dynamic information can be information about the current level of the battery of the CPNS unit, the state of the CPNS unit (e.g., current mode of the CPNS unit), the current state of wireless connection of the CPNS unit, etc.

The static information is preferably obtained and updated during the idle mode of the CPNS unit. For instance a controller or Device Management (DM) in each CPNS entity can be configured to send certain information (connection information with other entities) to the CPNS server 10. The dynamic information can be provided at a requested time, or at regular times, or in real time. For instance, the CPNS server 10 may request each of the CPNS entities to provide certain information at, e.g., every hour, and the CPNS entities can send such information at the requested times. The CPNS server 10 then compiles such information in association with the corresponding CPNS entity (which can be individually identified as shown in the above example).

The CPNS server 10 can store the static information and dynamic information for all the CPNS entities and itself in the storage unit. Furthermore, the CPNS server 10 can store user preference information and/or operator policy information for the CPNS entities and itself. The user preference information may indicate a user's preference of using one entity over another entity, which may vary depending on a specific function being performed. For instance, the CPNS server 10 can store that a user of PNE 2,1, PNE 2,2 and PNE 2,3 prefers to use PNE 2,2 over the other PNEs when playing a video. The operator policy information may indicate that a user may not have access to certain devices for specific functions, or may indicate an administrator/operator's preference in using one entity over others (e.g., to minimize bandwidth use, etc.). The user preference information and operator policy information may vary depending on the CPNS units or groups thereof, or may be the same for the CPNS enabler 100.

The CPNS server 10 can store the static information and the dynamic information in various forms. In one preferred example, such information and other information is stored in a graphical form as shown in FIG. 2. In the example of FIG. 2, the configurations/connections of the units of the CPNS enabler 100 are indicated in a tree form, where the dotted connection lines indicate that the corresponding CPNS units communication with each other via Bluetooth while the solid connection lines indicate Wi-Fi connections. Obviously, this is one example of the tree form and other types of trees or other graphical forms may be used to represent the configurations and other information about the CPNS enabler 100. Once the CPNS server 10 stores such graphs therein initially, then the graphs can be updated in real time or as desired, in the CPNS server 10.

In addition to (or lieu of) the connection information for the CPNS units, the CPNS server 10 stores and updates therein life expectancy information for each of the connections among the CPNS units based on the battery information for the CPNS units. The life expectancy information for a link among the CPNS units indicates a minimum number of time units that at least one of the CPNS units by the link has to perform a function/operation before it runs out of its battery and can no longer perform the function/operation. For instance, the life expectancy information for a link (i.e., connection) between the CPNS server 10 and one gateway may equal 100, which means that at least one of the CPNS server 10 and the gateway has 100 time unites (e.g., minutes) left to carry out functions (e.g., playing a video) before it runs out of the battery and can no longer perform the functions. This life expectancy information can be preferably represented and stored in the CPNS server 10 in a graph as shown in FIG. 3, which will be discussed later in more detail. The life expectancy information may also be referred herein as battery life information. Further, a number of different life expectancy information for each function of a link, for each link or CPNS unit, may be calculated, stored and updated by the CPNS server 10, e.g., life expectancy information for playing a video, life expectancy information for displaying GPS map, etc.

According to an embodiment, a link can be a local link or a global link. A local link is a link between two immediate CPNS units (e.g., CPNS server 10 and Gateway 2 in FIG. 2), where as a group of connected links (e.g., a longer link made up of different links from the CPNS server 10 to Devices 2,2,1 in FIG. 2) may be referred to as a global link.

To determine or calculate the life expectancy information for each link (CPNS connection between two CPNS units), the CPNS server 10 obtains the current battery level for each of the two CPNS units involved in the link, and uses that information and consumption information to calculate the life expectancy information for the link as follows in Formula A:

$$\text{Battery Life Of Link 1} = \text{Min}((\text{Battery of Unit } A)/(\text{Consumption of Link 1 by Unit } A), (\text{Battery of Unit } B)/(\text{Consumption of Link 1 by Unit } B)).$$

In the above, "Battery Life Of Link 1" is the life expectancy of Link 1, where Link 1 is a connection between Units A and B. A unit here is a CPNS unit (e.g., server, gateway, PNE, device, etc.). Also, "Battery of Unit A" is the current battery level of Unit A and "Consumption of Link 1 by Unit A" is the amount of battery/power used/usable by Unit A through Link 1 if Unit A were to be actively used (e.g., performing a function such as playing a video). The "Battery of Unit A" can be received directly from Unit A or can be calculated based on the total capacity of Unit A and % of remaining battery received from Unit A. As such, "(Battery of Unit A)/(Consumption of Link 1 by Unit A)" represents a length of life time remaining in Unit A when Unit A uses Link 1. All these parameters can be represented in various ways and units. For instance, "Battery of Unit A" may be represented in percentages or power units like mA (milli-amperes), and "Consumption of Link 1 by Unit A" may be represented in power/time unit, e.g., mA/h (milliamperes/hour). Then the formula takes the minimum of the values obtained for Unit A and Unit B. That is, it follows the formula of Min(Value 1, Value 2), where this function returns the smallest (Min) value of the two values. As a variation, the Life Expectancy of each link can be calculated in function of the capacity of the battery level divided by the power consumption of the link.

FIG. 3 shows an example of a life expectancy graph of the CPNS enabler 100 according to an embodiment of the invention, which can be stored in the CPNS server 10 and illustrate an example of a calculated life expectancy of each local link of the CPNS enabler of FIG. 2. This life expectancy graph can be created when the CPNS enabler 10 is in the idle mode (or non-active mode).

As shown in the example of FIG. 3, a number next to each link represents a number of minutes of use left before the corresponding CPNS unit has no battery or can no longer perform function(s). For instance, the number '300' on the link between Gateway 2 and the CPNS server 10 represents 300 minutes of communication remaining before one of the batteries of Gateway 2 and CPNS server 10 runs out. It is assumed that when the battery of a CPNS unit (e.g., CPNS server or entity) becomes empty, the CPNS unit cannot carry out the connection/communication. In the case of some CPNS units such as the CPNS server, the battery level of the CPNS server will be always full.

For each link, the CPNS server 10 determines the life expectancy according to Formula A noted above and can store this information therein as noted above. To do this, for example, in the idle mode, the CPNS server 10 can request each CPNS unit to send its battery information and consumption information and based on the obtained battery and consumption information, the CPNS server 10 can calculate/obtain the life expectancy information for each link in the idle mode. The same consumption information may be used for all functions of a CPNS unit or as a variation, different consumption information may be used respectively for different functions of a CPNS unit. For instance, a CPNS device can be in a Wi-Fi connection idle mode or Bluetooth connection idle mode, and depending on which connection mode, the CPNS device can have a different idle mode consumption number (e.g., one number for the Wi-Fi connection and another number for the Bluetooth connection, in the idle mode). Thus, depending on which function (e.g., Wi-Fi connection-based function or Bluetooth connection-based function) is of interest, appropriate consumption information may be used by the CPNS server 10 to calculate the life expectancy information. Then by performing calculations based on Formula A or the like above, the CPNS server 10 generates the life expectancy information. Table 1 below is an example of such life expectancy information (e.g., in minutes) for the links (local links and global links) between the CPNS server and each applicable CPNS entity of FIG. 3.

TABLE 1

|  | GW n | GW 1 | GW 2 | Device 2, 1, 1 | PNE 2, 1 | Device 2, 1, p |
| --- | --- | --- | --- | --- | --- | --- |
| Server 10 | 1000 | 200 | 300 | 200 | 200 | 200 |

For instance, in Table 1, a local link between the CPNS server 10 and Gateway 1 (GW 1) has 200 minutes of use time left before the CPNS server 10 or Gateway 1 runs out of the battery. In another example, a global link between the CPNS server 10 and Device 2,1,1 has 200 minutes of use time left before any one of the CPNS units involved in the global link runs out of the battery. This global link is made up of a local link between the CPNS server 10 and Gateway 2, a local link between Gateway 2 and PNE 2,1 and a local ink between PNE 2,1 and Device 2,1,1. Because these local links respectively have 300, 200 and 2000 life expectancy time units in the example of FIG. 3, a minimum or the lowest number among these values is taken and as a result, 200 is determined to be the life expectancy of this global link.

According to the present invention, after the life expectancy information for the links of the CPNS enabler 100 is obtained and stored in the idle mode as shown in one example of FIG. 3, the CPNS server 10 can then use this information to optimize the life expectancy of the CPNS enabler 100 by, e.g., changing the connections among the CPNS units to provide maximum use time (life expectancy). In addition to using the life expectancy information of the links, the CPNS server 10 can also use the user preference information and/or the policy information to optimize the life expectancy of the CPNS enabler 100. This optimization can occur in the idle mode or in an active/user mode (non-idle mode) and can occur in real time or as needed. For instance, the CPNS server can obtain life expectancy information on all other links of the CPNS enabler 100 and then select the connections with the improved life expectancy information so as to optimize the life expectancy of the CPNS enabler 100s. FIG. 4 shows an example of updated life expectancy information for the links of the CPNS enabler 100 of FIG. 3 according to an embodiment of the invention.

As shown in FIG. 4, the CPNS server can detect new or possible connections/links between the CPNS units, which are shown with the doted lines, and determine the life expectancy of each new link. Based on the updated life expectancy information, a below new/updated table (Table 2) can be generated for the CPNS enabler 100.

TABLE 2

|  | GW n | GW 1 | GW 2 | Device 2, 1, 1 | PNE 2, 1 | Device 2, 1, p |
| --- | --- | --- | --- | --- | --- | --- |
| Server 10 | 1000 | 300 | 300 | 300 | 300 | 300 |

As shown in Table 2, the life expectancy for some of the links improves in comparison with Table 1 if the new connections were to be used. More specifically, Table 3 below shows the comparison between Table 1 (life expectancy before optimization) and Table 2 (life expectancy after optimization).

TABLE 3

|  | GW n | GW 1 | GW 2 | Device 2, 1, 1 | PNE 2, 1 | Device 2, 1, p |
|---|---|---|---|---|---|---|
| Server (before optimization) | 1000 | 200 | 300 | 200 | 200 | 200 |
| Server (after optimization | 1000 | 300 | 300 | 300 | 300 | 300 |
| Time (life) saved | 0 | 100 | 0 | 100 | 100 | 100 |

Table 3 shows the amount of more use time obtained for the units of the CPNS enabler 100 according to the present invention. Accordingly, the CPNS server 10 can decide to implement the optimal links/connections to optimize the life expectancy of the CPNS enabler 100. For instance, if the user preference information or policy information indicates that the use of one CPNS unit/link over another CPNS unit/link, then such information may dictate which CPNS unit/link may be selected over other possible CPNS units/link or can override the life expectancy information. The CPNS server 10 can implement the new connections/links among the CPNS units as shown in FIG. 5, which shows the new links/connections having the optimized life expectancy. The new connections are shown with the dotted lines. All the optimization can occur in the idle more or in an active/user (non-idle) mode of the CPNS enabler or server or entity. For instance, during an active/user mode (e.g., after the wake up mode), the CPNS server 10 can analyze each CPNS unit's characteristics and update the life expectancy graph and other information stored therein. Each CPNS unit can send an Event/notice to the CPNS server when there is a modification in its dynamic characteristics. In function of these modifications, the CPNS server 10 can update in real time the life expectancy graph/information. The optimization process of the invention attempts to always to remove the link with the minimum or lowest of life expectancy, which will optimize the life expectancy and use of the CPNS enabler 100.

Now, two specific examples of the life expectancy optimization in an active or user mode according to an embodiment of the invention will be discussed referring to FIG. 6. The first example is discussed referring to FIG. 6 and the second example is discussed referring to FIG. 9. All components of the CPNS enablers of FIGS. 6-11 are operatively coupled and configured. Further, the specific CPNS entities in FIGS. 6-11 are mere examples and can be other devices. Moreover, the optimization steps which can be performed in the idle mode as discussed above, can occur in the active mode, as in these examples.

More specifically, in the first example as shown in FIGS. 6 and 7, a CPNS enabler 200 has the architecture/connections as shown, and includes a CPNS server 20, a handset 22 such as a smart phone or mobile terminal (CPNS gateway), a PC 24 (PNE 1), a GPS device 26 (PNE 2), and a handset with a GPS device/unit 28 (PNE 3, also referred to as 'handset with GPS'). Here, it is assumed that the PC 24 and the GPS device 26 are in their active/on mode while the handset with GPS 28 is in its idle/non-active mode. The CPNS server 20 and handset 22 (gateway) are in the active mode. The CPNS server 20 can obtain and store therein the life expectancy graph/information for each of the links shown in the figure, according to the various methods discussed above, e.g., in the idle mode, and such life expectancy information/graph may be updated as discussed above.

According to the CPNS service, assume that a user at the PC 24 is viewing a GPS map/data (or performing a GPS function) provided from the GPS device 26 through the handset 22 functioning as the CPNS gateway, which also communicates with the CPNS server 20. However, the GPS device 26 is running low on battery and would not be able to provide the GPS data to the PC 24 for a long time. In such a situation, according to the present invention, the GPS device 26 may notify the CPNS server 20 that the current battery level of the GPS device 26 is low (or below a certain preset level) or the CPNS server 20 requests the GPS device 26 to provide such information. Then the CPNS server 20 can check the life expectancy information for other links or other CPNS entities, and select another PNE or device which can provide the GPS map to the PC 24 for a longer period of time than the GPS device 26. For instance, as shown in FIG. 7, the CPNS server 20 may determine that the life expectancy of the handset with GPS 28 has a longer life expectancy than the GPS device 26 (e.g., for this function— GPS function) and can configure and instruct the handset with GPS 28 to provide the GPS map to the PC 24. As a result, the user at the PC 24 can continue to view the GPS map (now received from the handset with GPS 28 instead of the GPS device 26) for a longer period of time, which optimizes the CPNS service provided by the CPNS enabler 200.

FIG. 8 illustrates a flowchart illustrating a method of optimizing the life expectancy of the CPNS enabler of FIGS. 6 and 7 according to an embodiment of the invention. The steps in FIG. 8 are examples of specific steps involved in the CPNS optimization of FIGS. 6 and 7.

As shown in FIG. 8, at step S10, the GPS device 26 (PNE 2) sends GPS data (or a GPS function) to the PC 24 (PNE 1) through the handset 22 (Gateway), whereby the GPS data is displayed and viewed at the PC 24 by an end user. Then, at step S12, after the continuous use of the GPS device 26, the current battery level of the GPS device 26 becomes low (e.g., level below a preset threshold level), and this is indicated to the CPNS server 20 through the handset 22. This can be done by the GPS device 26 sending a message to the CPNS server 20 through the handset 22. This message can include a low battery indication/flag and/or the specific current battery level, for example, in numbers.

At step S14, upon receipt of this message, the CPNS server 20 requests a battery level from each of all the CPNS devices/units of the CPNS enabler 200. This can be done by the CPNS server 20 sending a battery level request message to the handset 22. At step S16, the handset 22 (GW) then sends a battery level request message to each of the CPNS entities, i.e., the handset with GPS 28, the GPS device 26 and the PC 24. In this regard, the handset 22 may not send the battery level request message to the GPS device 26 if the GPS 26 has already communicated its specific battery level (e.g., in numbers/units) to the CPNS server 20 at step S12. Then each of the CPNS entities sends its specific current battery level information (e.g., specific battery level in numbers/units) to the handset 22, which is forwarded to the CPNS server 20 at step S18. As a variation to steps S14-S16, the CPNS server 20 can send three separate battery level request messages respectively to the three CPNS entities through the handset 22 to obtain the battery levels.

At step S20, the CPNS server 20 analyzes the obtained battery level information and determines to switch from the GPS device 26 (low battery) to the Handset with GPS 28 (high battery). For instance, the CPNS server 20 can calculate and/or analyze the life expectancy information for the links of the CPNS enabler 200 as discussed above (e.g., using Formula A) based on the obtained battery level information. The CPNS server 20 can prestore the consumption information of each link by each CPNS entity, which can be provided in advance by each CPNS entity. Then the CPNS server 20 determines that the life expectancy for the link associated with the handset with GPS 28 is greater than the life expectancy for the link associated with the GPS device 26, and thus sends a request/message to the handset 22 to switch from the GPS device 26 to the handset with GPS 28. In addition to the life expectancy for the links, as mentioned above the CPNS server 20 can also consider the user preference information and/or operator policy information to select an appropriate link/unit. This updated/optimized life expectancy information as well as the new configuration information of the CPNS enabler in the active mode can also be stored in the CPNS server 20.

Then at step S22, the handset (GW) 22 sends a message to the handset with GPS 28 (which is currently in the idle mode) to wake up, and thereby places the handset with GPS 28 in the active/on mode. At step S24, the handset 22 sends a request/message to provide GPS data, to the handset with GPS 28, and thereby receive the GPS data. The handset 22 then sends the GPS data received now from the handset with GPS 28 to the PC 24 so that the user at the PC 24 can continuously view the GPS data (or have access to GPS functions). At step S26, the handset 22 can place the GPS device 26 in the idle mode since it is not being used and is running out of battery. Accordingly, the present invention optimizes the life expectancy of the CPNS enabler and thereby enhances the user experience.

In the second example as shown in FIGS. 9 and 10, a CPNS enabler 300 has the architecture/connections as shown, and includes a CPNS server 30, a handset 32 such as a smart phone or mobile terminal (CPNS gateway), a PC 34 (PNE 1), a GPS device 36 (PNE 2), and a video player 38 (PNE 3). Here, it is assumed that the PC 34 and the GPS device 36 are in their active/on mode while the video player 38 is in its idle/non-active mode. The CPNS server 30 and handset 32 (GW) are in the active mode. The CPNS server 30 can obtain and store therein the life expectancy graph/information for each of the links shown in the figure, according to the various methods discussed above, e.g., in the idle mode, and such life expectancy information/graph can be updated as discussed above.

According to the CPNS service, assume that a user at the PC 34 is viewing a GPS map/data provided from the GPS device 36 through the handset 32 functioning as the CPNS gateway, which also communicates with the CPNS server 30. However, the PC 34 is running low on battery and would not be able to display the GPS data on the PC 34 soon. In such a situation, according to the present invention, the PC 34 may notify the CPNS server 30 that the current battery level of the PC 34 is low (or below a certain preset level) or the CPNS server 30 requests the PC 34 to provide such information. Then the CPNS server 30 can check the life expectancy information for other links or other CPNS entities, and select another PNE or device which can display the GPS data to the user for a longer period of time than the PC 34. For instance, as shown in FIG. 10, the CPNS server 30 may determine that the life expectancy of the video player 38 has a longer life expectancy than the PC 34 and can configure and instruct the video player 38 to display the GPS data for the user. As a variation, the use of the video player 38 can occur when the user consents to it (e.g., since the user has to move to the video player 38 or the video player 38 needs to be moved to the user). As a result, the user can view the GPS map continuously and for a longer period of time at the video player 38, which optimizes the CPNS service provided by the CPNS enabler 300.

FIG. 11 illustrates a flowchart illustrating a method of optimizing the life expectancy of the CPNS enabler of FIGS. 9 and 10 according to an embodiment of the invention. The steps in FIG. 11 are examples of specific steps involved in the CPNS optimization of FIGS. 9 and 10.

As shown in FIG. 11, at step S30, the GPS device 36 (PNE 2) sends GPS data to the PC 34 (PNE 1) through the handset 32 (Gateway), whereby the GPS data is displayed and viewed at the PC 34 by an end user. Then, at step S32, after the continuous use of the PC 34, the current battery level of the PC 34 becomes low (e.g., level below a preset threshold level), and this is indicated to the CPNS server 30 through the handset 32. This can be done by the PC 34 sending a message to the CPNS server 30 through the handset 32. This message can include a low battery indication/flag and/or the specific current battery level, for example, in numbers.

At step S34, upon receipt of this message, the CPNS server 30 requests a battery level from each of all the CPNS devices/units of the CPNS enabler 300. This can be done by the CPNS server 30 sending a battery level request message to the handset 32. At step S36, the handset 32 (GW) then sends a battery level request message to each of the CPNS entities, i.e., the video player 38, the GPS device 36 and the PC 34. In this regard, the handset 32 may not send the battery level request message to the PC 34 if the PC 34 has already communicated its specific battery level (e.g., in numbers/units) to the CPNS server 30 at step S32. Then each of the CPNS entities sends its specific current battery level information to the handset 32, which is forwarded to the CPNS server 30 at step S38. As a variation to steps S34-S36, the CPNS server 30 can send three separate battery level request messages respectively to the three CPNS entities through the handset 32 to obtain the battery level information.

At step S40, the CPNS server 30 analyzes the obtained battery level information and determines to switch from the PC 34 (low battery) to the video player 38 (high battery). For instance, the CPNS server 30 can calculate and/or analyze the life expectancy information for the links of the CPNS enabler 300 as discussed above (e.g., using Formula A above) based on the obtained battery level information. The CPNS server 30 can prestore the consumption information of each link by each CPNS entity, which can be provided in advance by each CPNS entity. Then the CPNS server 30 determines that the life expectancy for the link associated with the video player 38 is greater than the life expectancy for the link associated with the PC 34, and thus sends a request/message to the handset 32 to switch from the PC 34 to the video player 38. In addition to the life expectancy for the links, as mentioned above the CPNS server 30 can also consider the user preference information and/or operator policy information to select an appropriate link/unit. The updated/optimized life expectancy information as well as the new configuration information of the CPNS enabler in the active mode can also be stored in the CPNS server 30.

Then at step S42, the handset 32 (GW) then sends a message to the PC 34, which requests an input from the user regarding the switch. For instance, the message may instruct the PC 34 to display a message asking the user if the user wants to use the video player. In this example, the message displayed to the user at the PC 34 can state, for instance, "Low Battery—do you want to use the video player?". Then the user can decide whether or not the user wants to use the video player and enters a corresponding response to the PC 34, which is then communicated from the PC 34 to the handset 32. As a variation, instead of requesting whether or not the user wants to switch, a message can be displayed on the PC 34, which basically informs the user that due to the low battery, the GPS data will be displayed on the video player after a certain time duration, e.g., after 5 minutes. In such a case, the user can reposition himself/herself in front of the video player 38 if the user wants to continue to have access to the GPS data.

Then at step S44, the handset (GW) 32 sends a message to the video player 38 (which is currently in the idle mode) to wake up, and thereby places the video player 38 in the active/on mode. At step S46, the handset 32 sends a request/message to provide GPS data, to the PC 34 (or GPS device 36) and thereby receive the GPS data. The handset 32 then sends the received GPS data to the video player 38 so that the user, now at the video player 38, can continuously view the GPS data. At step S48, the GPS device 36 continues to send the GPS data but now to the video player 38 through the handset 32, and the video player 38 displays the GPS data for the user to view. In this regard, the CPNS server 30 (or the handset 32) can send instructions to the GPS device 36 to send the GPS data now to the video player 38 and not to the PC 34. As a result, the user can continue to view or have access to GPS data by switching from using the PC 34 to the video player 38, under control of the CPNS server 30 and/or handset 32. The handset 32 can also place the PC 34 in the idle mode since it is not being used and is running out of battery. Accordingly, the present invention optimizes the life expectancy of the CPNS enabler and thereby enhances the user experience.

According to an embodiment of the invention, although the optimization of the life expectancy of the CPNS enabler has been discussed, the same concepts of the invention can be applied to generate and optimize end user information/graphs, signal strength information/graphs, bandwidth information/graphs, and ping information/graphs. Each of these features of the CPNS enabler can be determined and considered to improve the operations of the CPNS enabler.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for optimizing resources of a Converged Personal Network Service (CPNS) enabler, the CPNS enabler including a CPNS server and a plurality of CPNS entities, the plurality of CPNS entities including a CPNS gateway and a plurality of Personal Network Elements (PNEs) including first, second, third and fourth PNEs, the method comprising:
   transmitting, by the CPNS gateway to the CPNS server, battery level information of the plurality of PNEs when the first PNE is currently performing a specific service in an active mode with the third PNE;
   selecting, among the second PNE and the fourth PNE, a switching PNE to be switched in the first PNE based on the battery level information of the plurality of PNEs or user preference information,
   wherein if the CPSN server does not include the user preference information, the switching PNE is selected as the PNE having the higher battery level among the second PNE and the fourth PNE,
   wherein if the CPSN server includes the user preference information, the switching PNE is selected based on the user preference information without reference to the battery level information, and
   wherein if the CPSN server includes user selection information, the switching PNE is selected based on the user selection information without reference to the battery level information and the user preference information;
   receiving, by the CPNS gateway from the CPNS server, an instruction message to switch from the first PNE to the switching PNE for performing the specific service;
   transmitting, by the CPNS gateway, a message to wake up to the switching PNE from an idle mode to an active mode;
   receiving, by the CPNS gateway, a response message in response to the message to wake up from the switching PNE;
   requesting, by the CPNS gateway, data for the specific service from the switching PNE;
   in response to the requesting, receiving, by the CPNS gateway, data for the specific service from the switching PNE; and
   transmitting, by the CPNS gateway, the received data for the specific service to the third PNE.

2. The method of claim 1, further comprising:
   establishing a communication path between the switching PNE and the third PNE through the CPNS gateway; and
   allowing the specific service of the switching PNE to be performed at the third PNE through the communication path.

3. The method of claim 1, further comprising:
   after receiving the instruction message, transmitting a message to the third PNE prior to transmitting the message to wake up the switching PNE.

4. The method of claim 1, wherein the specific service includes a global positioning system (GPS) service, a multimedia service, or a mobile terminal service.

5. The method of claim 1, wherein the CPNS gateway is a mobile terminal.

6. A Converged Personal Network Service (CPNS) gateway for optimizing resources of a CPNS enabler including a CPNS server and a plurality of CPNS entities, the plurality of CPNS entities including the CPNS gateway and a plurality of Personal Network Elements (PNEs) including first, second, third and fourth PNEs, the CPNS gateway comprising:
   a transceiver; and
   a processor, cooperating with the transceiver and configured to:
   transmit, to the CPNS server, battery level information of the plurality of PNEs when the first PNE is currently performing a specific service in an active mode with the third PNE,
   select, among the second PNE and the fourth PNE, a switching PNE to be switched in the first PNE based on the battery level information of the plurality of PNEs or user preference information,
   wherein if the CPSN server does not include the user preference information, the switching PNE is selected as the PNE having the higher battery level among the second PNE and the fourth PNE,
   wherein if the CPSN server includes the user preference information, the switching PNE is selected based on the user preference information without reference to the battery level information, and wherein if the CPSN server includes user selection information, the switching PNE is selected based on the user selection information without reference to the battery level information and the user preference information, receive, from the CPNS server, an instruction message to switch from the first PNE to the switching PNE for performing the specific service, transmit a message to wake up to the switching PNE from an idle mode to an active mode;

receive a response message in response to the message to wake up from the switching PNE;

request data for the specific service from the switching PNE;

in response to the request, receive data for the specific service from the switching PNE; and transmit the received data for the specific service to the third PNE.

7. The CPNS gateway of claim 6, wherein the processor is further configured to:

establish a communication path between the switching PNE and the third PNE through the CPNS gateway; and allow the specific service of the switching PNE to be performed at the third PNE through the communication path.

8. The CPNS gateway of claim 6, wherein the processor is further configured to:

after receiving the instruction message, transmit a message to the third PNE prior to transmit the message to wake up the switching PNE.

9. The CPNS gateway of claim 6, wherein the specific service includes a global positioning system (GPS) service, a multimedia service, and a mobile terminal service.

10. The CPNS gateway of claim 6, wherein the CPNS gateway is a mobile terminal.

* * * * *